(12) United States Patent
Sekiguchi

(10) Patent No.: US 9,491,519 B2
(45) Date of Patent: *Nov. 8, 2016

(54) METHODS AND DEVICES FOR PRESENTING AN INTERACTIVE MEDIA GUIDANCE APPLICATION

(71) Applicant: Rovi Guides, Inc., Santa Clara, CA (US)

(72) Inventor: Junya Sekiguchi, Tokyo (JP)

(73) Assignee: Rovi Guide, Inc., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/742,117

(22) Filed: Jun. 17, 2015

(65) Prior Publication Data
US 2015/0289027 A1     Oct. 8, 2015

Related U.S. Application Data

(63) Continuation of application No. 12/943,103, filed on Nov. 10, 2010, now Pat. No. 9,071,372, which is a continuation of application No. 11/967,504, filed on Dec. 31, 2007, now abandoned.

(60) Provisional application No. 61/014,916, filed on Dec. 19, 2007.

(51) Int. Cl.
*H04N 5/775*      (2006.01)
*H04N 21/442*     (2011.01)
(Continued)

(52) U.S. Cl.
CPC ............ *H04N 21/482* (2013.01); *H04H 60/51* (2013.01); *H04H 60/53* (2013.01); *H04H 60/65* (2013.01); *H04H 60/72* (2013.01); *H04N 5/44543* (2013.01); *H04N 5/775* (2013.01); *H04N 21/25841* (2013.01); *H04N 21/4126* (2013.01); *H04N 21/4227* (2013.01); *H04N 21/4524* (2013.01); *H04N 21/47214* (2013.01); *H04N 21/485* (2013.01); *H04N 21/4821* (2013.01); *H04N 21/44222* (2013.01); *H04N 21/4755* (2013.01)

(58) Field of Classification Search
CPC ..................... H04N 21/25841; H04N 21/482; H04N 21/4126; H04N 21/4227; H04N 21/44222; H04N 21/4524; H04N 21/4821; H04N 5/44543; H04N 5/775; H04H 60/51; H04H 60/53; H04H 60/65; H04H 60/72
See application file for complete search history.

(56) References Cited

U.S. PATENT DOCUMENTS

2007/0111717 A1*    5/2007    Mueller et al. ............... 455/418

OTHER PUBLICATIONS

Hirahara, Broadcast Receiver, Program Guide Display method, Program Guide Dislplay Program, Oct. 2005—English Translation of JP2005294962.*

(Continued)

*Primary Examiner* — Benjamin R Bruckart
*Assistant Examiner* — Jen-Shi Huang
(74) *Attorney, Agent, or Firm* — Ropes & Gray LLP

(57) ABSTRACT

Methods and devices for presenting an interactive media guidance application are provided. In some embodiments, methods for presenting an interactive media guidance application in a user equipment device are provided, the methods comprising: determining a location of the user equipment device; determining a destination of the user equipment device; determining an arrival time for the user equipment device to be located at the destination; selecting, as guide listings, listings corresponding to media available at the destination at/after the arrival time; and presenting the guide listings on the user equipment device.

20 Claims, 16 Drawing Sheets

(51) Int. Cl.
*H04N 21/475* (2011.01)
*G06F 3/00* (2006.01)
*G06F 13/00* (2006.01)
*H04N 5/445* (2011.01)
*H04N 21/482* (2011.01)
*H04N 21/41* (2011.01)
*H04N 21/485* (2011.01)
*H04N 21/258* (2011.01)
*H04H 60/51* (2008.01)
*H04H 60/53* (2008.01)
*H04H 60/65* (2008.01)
*H04H 60/72* (2008.01)
*H04N 21/4227* (2011.01)
*H04N 21/45* (2011.01)
*H04N 21/472* (2011.01)

(56) References Cited

OTHER PUBLICATIONS

Hirahara, JP2005-294962 A Oct. 2005—Japenese version.*

* cited by examiner

1800

TRIP WIZARD

| | | |
|---|---|---|
| Depature Date | December 26, 2007 | 1802 |
| Return Date | January 2, 2008 | 1804 |
| Destination | Hilton, Waikiki | 1806 |
| Generate Reminders at Destination? | Y | 1808 |
| Record Favorite Shows? | Y | 1810 |
| Forward Favorite Shows to Destination? | Y | 1812 |

FIG. 18

METHODS AND DEVICES FOR PRESENTING AN INTERACTIVE MEDIA GUIDANCE APPLICATION

CROSS-REFERENCE TO RELATED APPLICATIONS

This application is a continuation of U.S. patent application Ser. No. 12/943,103, filed Nov. 10, 2010, currently pending, which is a continuation of U.S. patent application Ser. No. 11/967,504, filed Dec. 31, 2007, now abandoned, which claims the benefit of U.S. Provisional Application No. 61/014,916, filed Dec. 19, 2007, the disclosures of which are hereby incorporated by reference herein in their entireties.

BACKGROUND OF THE INVENTION

With recent advancements in communications network technologies, a traveler has virtually unlimited access to information and media content that may be provided via networks such as the Internet. For the average person that wishes to watch a movie (or any other media content) during a trip, or determine what that person can watch when he or she arrives at his or her destination, however, the task of identifying available media content can be overwhelming.

Accordingly, it is desirable to provide mechanisms to simplify the tasks of determining what media content is available during a trip and determining what media content is available at a traveler's destination.

SUMMARY OF THE INVENTION

Methods and devices for presenting an interactive media guidance application are provided in accordance with various embodiments of the present invention. In some embodiments, methods for presenting an interactive media guidance application in a user equipment device are provided, the methods comprising: determining a location of the user equipment device; determining a destination of the user equipment device; determining an arrival time for the user equipment device to be located at the destination; selecting, as guide listings, listings corresponding to media available at the destination at/after the arrival time; and presenting the guide listings on the user equipment device. The method may further comprise receiving the guide listings prior to determining the location and determining the destination.

In some embodiments, devices for presenting an interactive media guidance application are provided, the devices comprising: processing circuitry that: determines a location of the device; determines a destination of the device; determines an arrival time for the device to be located at the destination; and selects, as guide listings, listings corresponding to media available at the destination at/after the arrival time; and a display that presents the guide listings. The processing circuitry may also receive the guide listings prior to determining the location and determining the destination.

In some embodiments, devices for presenting an interactive media guidance application are provided, the devices comprising: means for determining a location of the device; means for determining a destination of the device; means for determining an arrival time for the device to be located at the destination; means for selecting, as guide listings, listings corresponding to media available at the destination at/after the arrival time; and means for presenting the guide listings on the device. The device may further comprise means for receiving the guide listings prior to determining the location and determining the destination.

BRIEF DESCRIPTION OF THE DRAWINGS

FIG. 18 illustrates an example of a trip wizard in accordance with some embodiments of the present invention.

DETAILED DESCRIPTION OF VARIOUS EMBODIMENTS

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content (which may be referred to herein as "programs" or "programming") including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications may also allow users to navigate among and locate content related to the video content including, for example, video clips, articles, advertisements, chat sessions, games, etc.

With the advent of the Internet, mobile computing, and high-speed wireless networks, users are accessing media on personal computers (PCs) and other devices on which they traditionally did not, such as hand-held computers, personal digital assistants (PDAs), mobile telephones, vehicle entertainment systems, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

Figure 1:
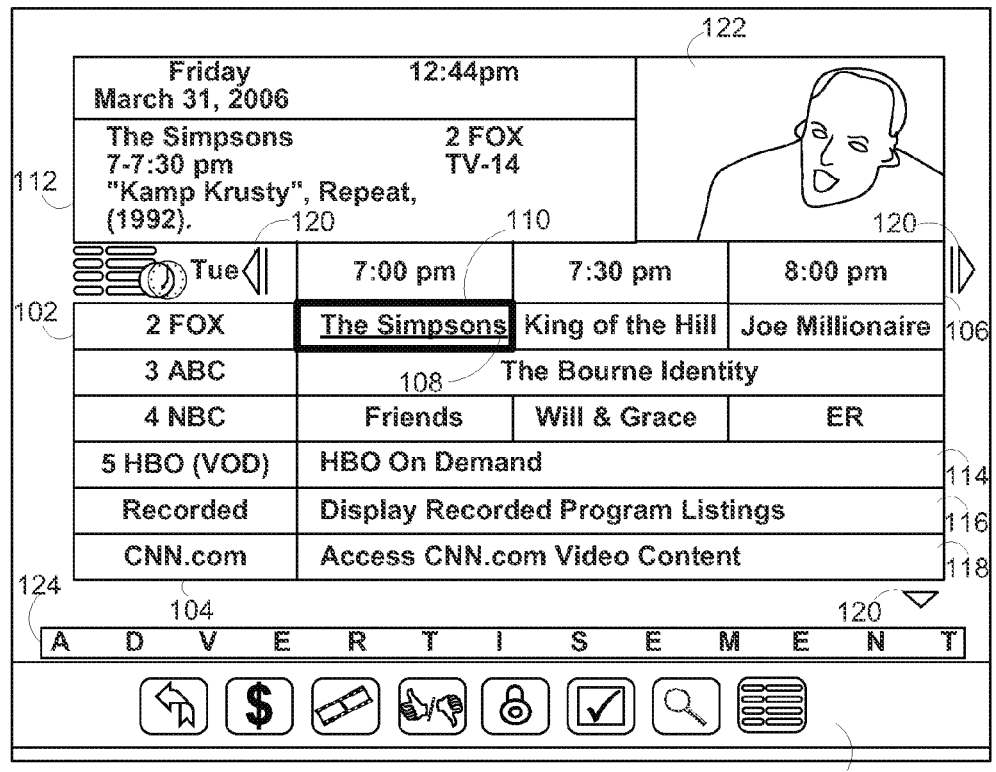
FIG. 1 illustrates an example of a grid display in an interactive media guidance application in accordance with some embodiments of the present invention.
Figure 2:
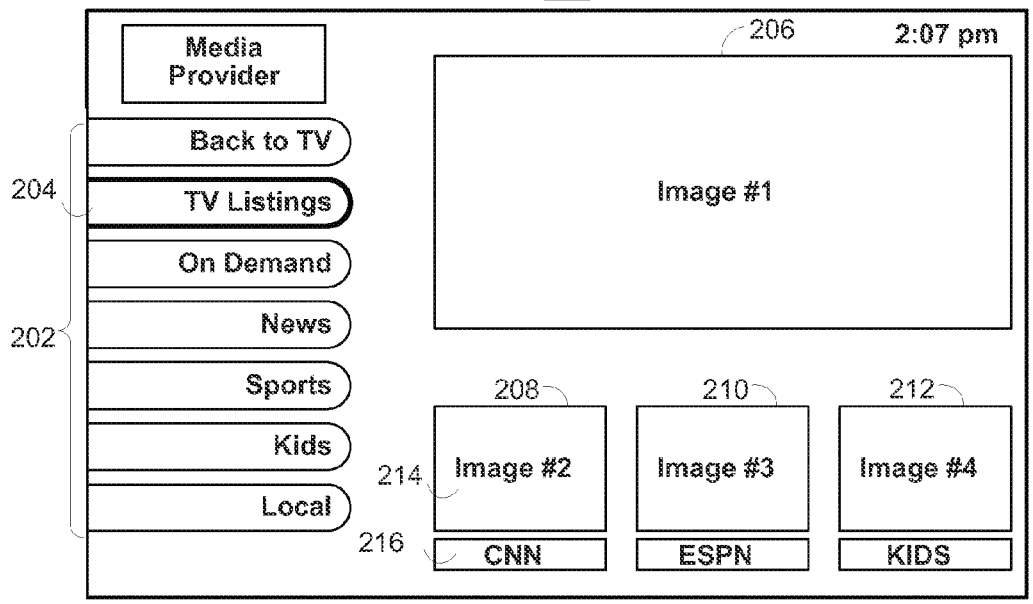
FIG. 2 illustrates an example of a mosaic display in an interactive media guidance application in accordance with some embodiments of the present invention.

One of the functions of the media guidance application is to provide media listings and media information to users. FIGS. 1-2 show illustrative display screens that may be used to provide media guidance, and in particular media listings. The display screens shown in FIGS. 1-2, 7-14, and 16 may be implemented on any suitable device or platform. While the displays of FIGS. 1-2, 7-14, and 16 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, a media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, a media guidance application may also provide access to non-linear programming which is not provided according to a schedule. Non-linear programming may include content from different media sources including on-demand media content (e.g., video-on-demand (VOD)), Internet content (e.g., streaming media, downloadable media, etc.), locally stored media content (e.g., video content stored on a digital video recorder (DVR), digital video/versatile disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND, THE SOPRANOS, and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g., FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed may be based on user selection or guidance application definition (e.g., a display of only recorded and broadcast listings, only on-demand and broadcast listings, etc.), and any suitable permutation may be used. As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. Patent Application Publication No. 2003/0110499 A1, published Jun. 12, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting a program and/or channel as a favorite, purchasing a program, or other features. Options available from a main menu display may include search options, VOD options, parental control options, options to access to various types of listing displays, options to subscribe to a premium service, options to edit a user's profile, options to access a browse overlay, or other options.

The media guidance application may be personalized based on a user's preferences. A personalized media guidance application may allow a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. Patent Application Publication No. 2005/0251827 A1, published Nov. 10, 2005, Boyer et al., U.S. Pat. No. 7,165,098, issued Jan. 16, 2007, and Ellis et al., U.S. Patent Application Publication No. 2002/0174430 A1, published Nov. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. The listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are illustrated as being of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324, 202, filed Dec. 29, 2005, which is hereby incorporated by reference herein in its entirety.

Figure 3A:
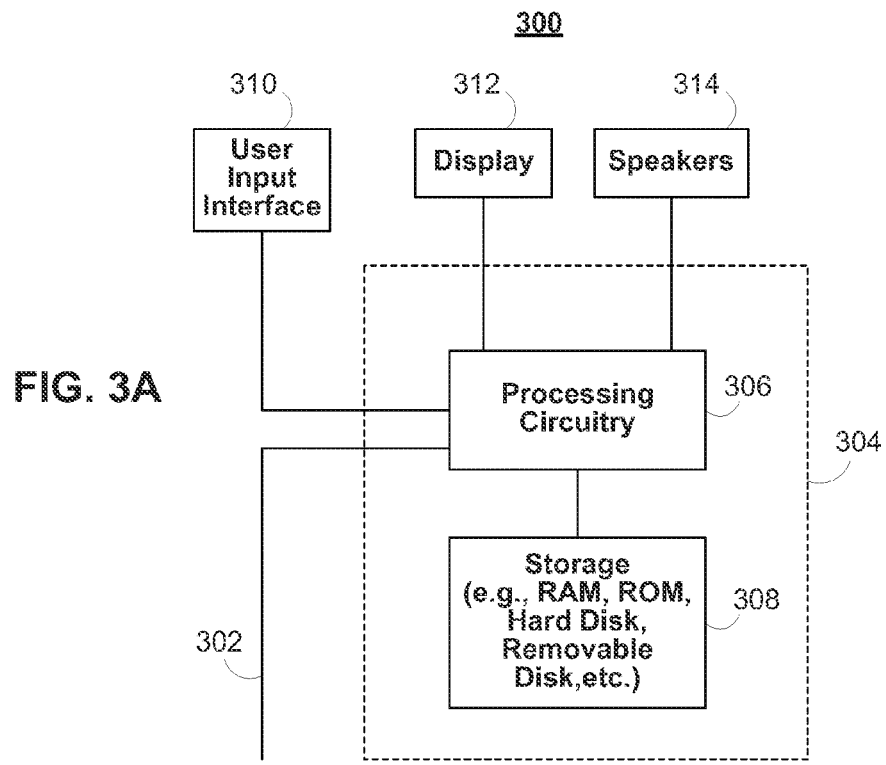
FIGS. 3A and 3B illustrate examples of user equipment devices the may be used to implement an interactive media guidance application in accordance with some embodiments of the present invention.

Users may access media content and the media guidance application (and its display screens described above and below) from one or more of their user equipment devices. FIG. 3A shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3A to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, a wireless modem for communications with other equipment, a fiber-optic communications interface, a network interface (e.g., for an Ethernet network), and/or any other suitable interface. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Non-volatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

Figure 3B:
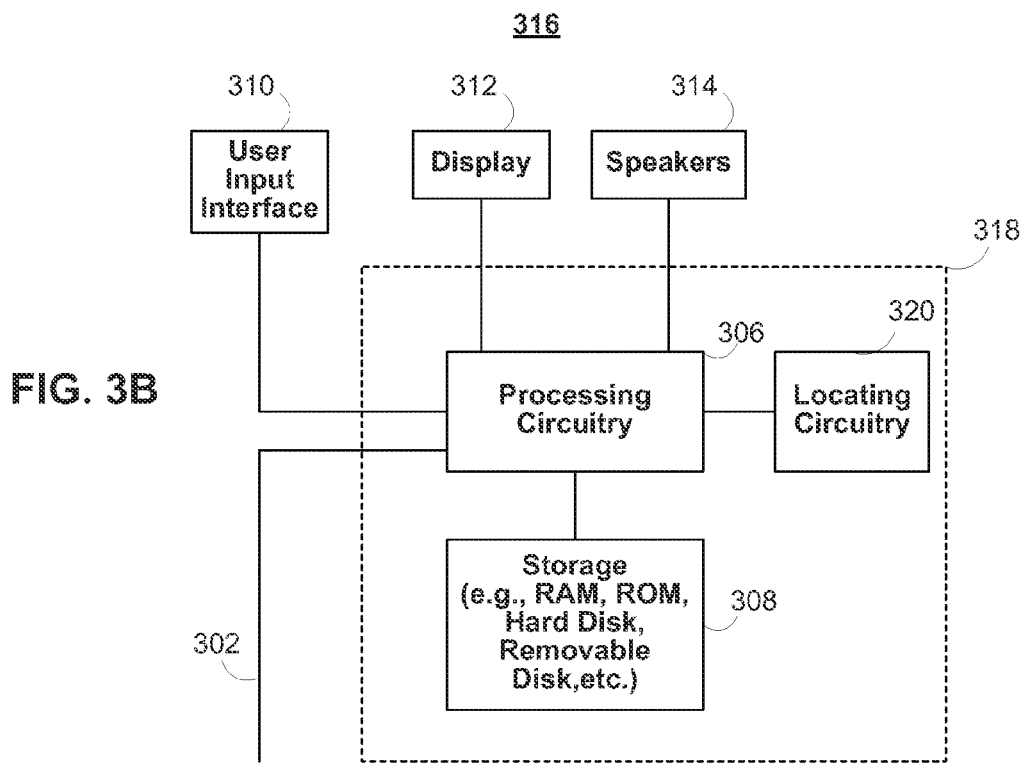

As shown in FIG. 3B, in some embodiments, a user equipment device 316 similar to user equipment device 300 of FIG. 3A may also include locating circuitry 320 as part of control circuitry 318. Locating circuitry 320 may be any suitable mechanism for determining the location of user equipment device 316. For example, locating circuitry 320 may include Global Positioning System (GPS) circuitry, such as a GPS receiver. As another example, locating circuitry 320 may include radio telemetry circuitry, mobile phone locating circuitry, wireless network triangulation circuitry, etc. In some embodiments, in addition to providing location information, location circuitry may also provide traffic and/or travel information, which may include information regarding congestion, accidents, flight delays, weather, etc.

Referring back to user equipment device 300 of FIG. 3A, although device 300 is illustrated as not including locating circuitry, in some embodiments, a device 300 may nevertheless be able to determine its location. For example, a device 300 may determine its location by including hardware or software for identifying a local area network or a portion of a wide area network to which it is connected. Similarly, a device 300 may determine its location based on any suitable signal received (e.g., such as a local television signal) by the device.

Figure 4:
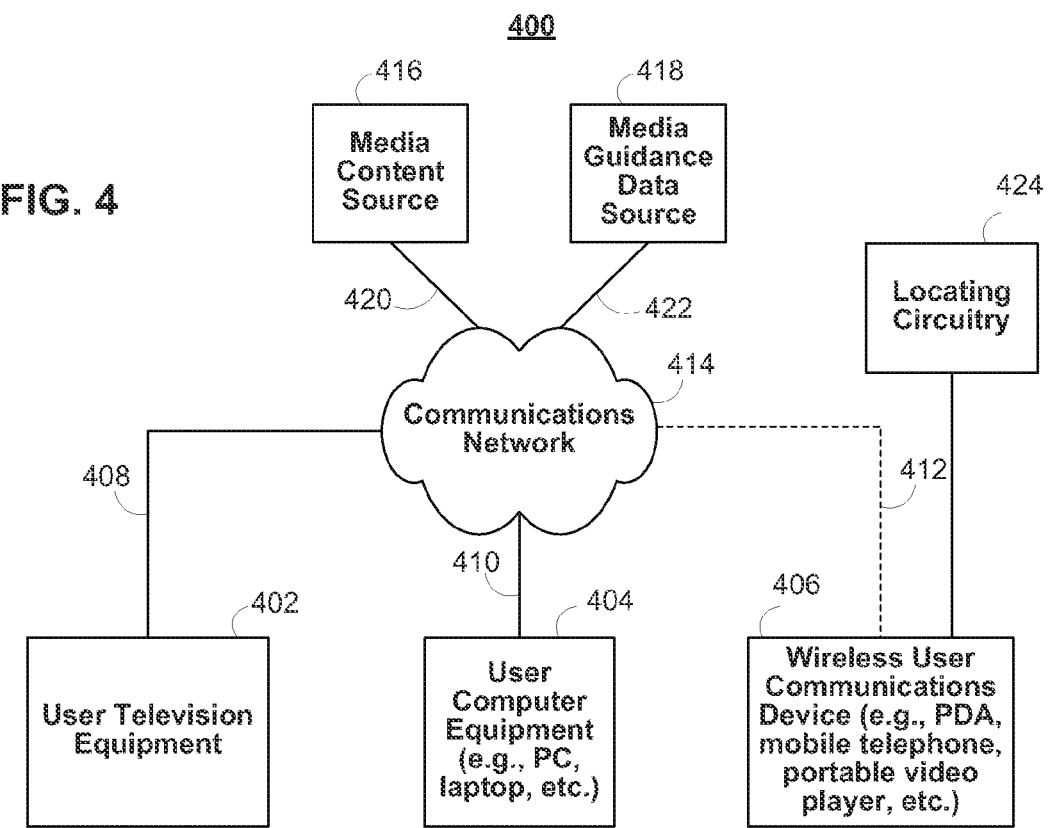
FIG. 4 illustrates an example of a system for implementing an interactive media guidance application in accordance with some embodiments of the present invention.

User equipment device 300 of FIG. 3A and user equipment device 316 of FIG. 3B can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV (now known as MSN TV) is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIGS. 3A and 3B and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In some embodiments, as illustrated in FIG. 4, wireless user communications device 406 may be coupled to locating circuitry 424. Locating circuitry 424 may be substantially the same as locating circuitry 320, described above in connection with FIG. 3B. In some embodiments, locating circuitry 424 may be part of another system. For example, locating circuitry 424 may be part of a navigation system (e.g., an embedded or portable navigation system), part of an automobile concierge system (e.g., OnStar), part of a safety system (e.g., mobile phone GPS circuitry), etc. ONSTAR is a trademark owned by OnStar Corporation. Locating circuitry may be coupled to wireless user communications device 406 using any suitable mechanism, such as using short-range point-to-point communication paths, such as an NMEA 0183 interface, an NMEA 2000 interface, a USB cable, an IEEE 1394 cable, a wireless path (e.g., Bluetooth, infrared, IEEE 802-11x, etc.), or another form of short-range communications via a wired or wireless path. Although locating circuitry 424 is illustrated in FIG. 4 as being coupled to wireless user communication device 406, in some embodiments, circuitry 424 can be omitted or additionally or alternatively similarly coupled to user television equipment 402 and/or user computer equipment 404 as desired.

In addition to providing an interactive media guidance application, in some embodiments, some or all of user television equipment 402, user computer equipment 404, and/or wireless user communications device 406 can provide other functions. For example, these user equipment devices may provide navigation functions as part of an embedded or a portable navigation system. As a more particular example, an interactive media guidance application and a navigation system may be included in user equipment devices used on, or which are part of, an automobile, a motorcycle, a boat, a ship, an airplane, or other vehicle. As another more particular example, an interactive media guidance application and a navigation system may be included in user equipment devices which are also mobile telephones, portable entertainment devices (e.g., such as music or video players), portable email devices, etc.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to control, and/or maintain consistent media guidance application settings across, in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel may appear as a favorite on the user's in-home devices (e.g., user television equipment and user computer equipment) as well as the user's mobile devices, if desired. As another example, a user may specify using one device (e.g., a portable device or one mounted in the user's automobile) that a program is to be recorded on another of the user's devices (e.g., the user's home device). Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 may be coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a trademark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a trademark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. Patent Application Publication No. 2003/0149988 A1, published Aug. 7, 2003, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of Media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Application Publication No. 2005/0251827 A1, published Nov. 10, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access a media guidance application on a website via a personal computer at their office, on a mobile device such as a PDA or web-enabled mobile telephone, on a vehicle-based system that is part of or coupled to a navigation system, etc. The user may set various settings (e.g., recordings, reminders, or other settings) on the guidance application to control the user's in-home equipment. The guide may control the user's equipment directly, or by communicating with a media guidance application on the user's in-home equipment. Various systems and methods for user equipment devices communicating, where the user equipment devices are in locations remote from each other, are discussed in, for example, Ellis et al., U.S. Patent Application Publication No. 2005/0028208 A1, published Feb. 3, 2005, which is hereby incorporated by reference herein in its entirety.

In a third approach, users of user equipment devices inside and outside a home can use their media guidance application to communicate directly with media content source 416 to access media content. Specifically, within a home, users of user television equipment 402 and user computer equipment 404 may access the media guidance application to navigate among and locate desirable media content. Users may also access the media guidance application outside of the home using wireless user communications devices 406 to navigate among and locate desirable media content.

It will be appreciated that while the discussion of media content has focused on video content, the principles of media guidance can be applied to other types of media content, such as music, images, etc.

In some embodiments, an interactive media guidance application may be presented based upon a current location, a destination, and/or an arrival time of a traveling user. Such an interactive media guidance application may be part of, or coupled to, navigation system in an automobile (or other vehicle), for example. As another example, when implemented with a navigation system, an interactive media guidance application may be launched from within the navigation system as a feature of the navigation system.

Figure 5:
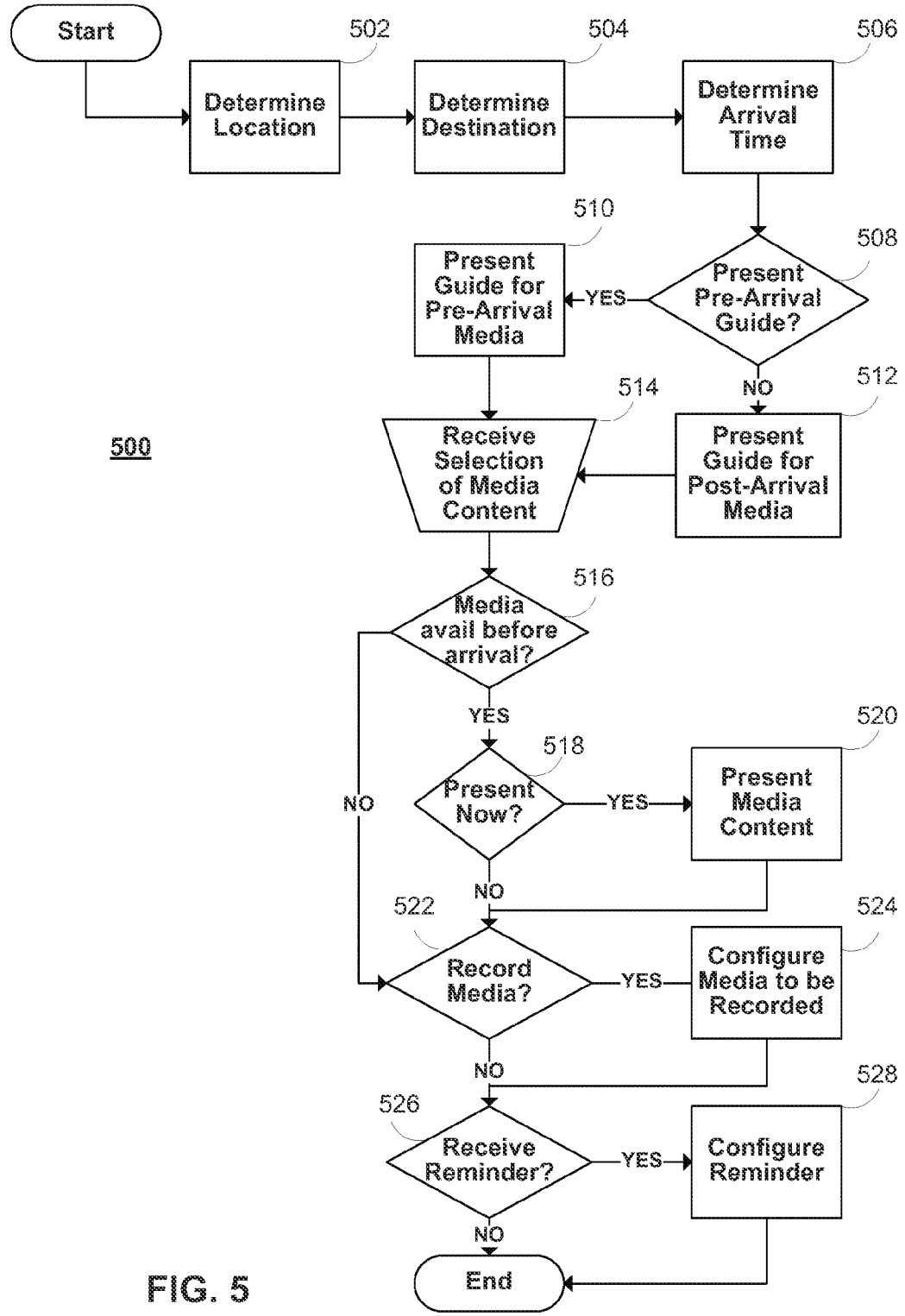
FIG. 5 illustrates an example of a process for implementing an interactive media guidance application that is based upon a current location, a destination, and/or an arrival time of a traveling user in accordance with some embodiments of the present invention.

Turning to FIG. 5, a process 500 that may be used to implement an interactive media guidance application based upon a current location, a destination, and/or an arrival time of a traveling user is illustrated. As shown, beginning at step 502, process 500 may first determine the current location of a user and/or the user's user equipment device. The current location may be represented as any suitable geographic reference. For example, the location may be represented as an address, a city, a county, a state, a zip code, a latitude and longitude, an area code, etc. This determination may be made in any suitable manner using any suitable information. For example, in some embodiments, this determination may be made using a satellite position location system, such as the Global Positioning System. As another example, this determination may be made by receiving information from the user, such as in response to a prompt or using a default setting. As still another example, this determination may be made by determining the location of a network (such as a local wireless network) to which the user equipment device is coupled.

Figure 13:
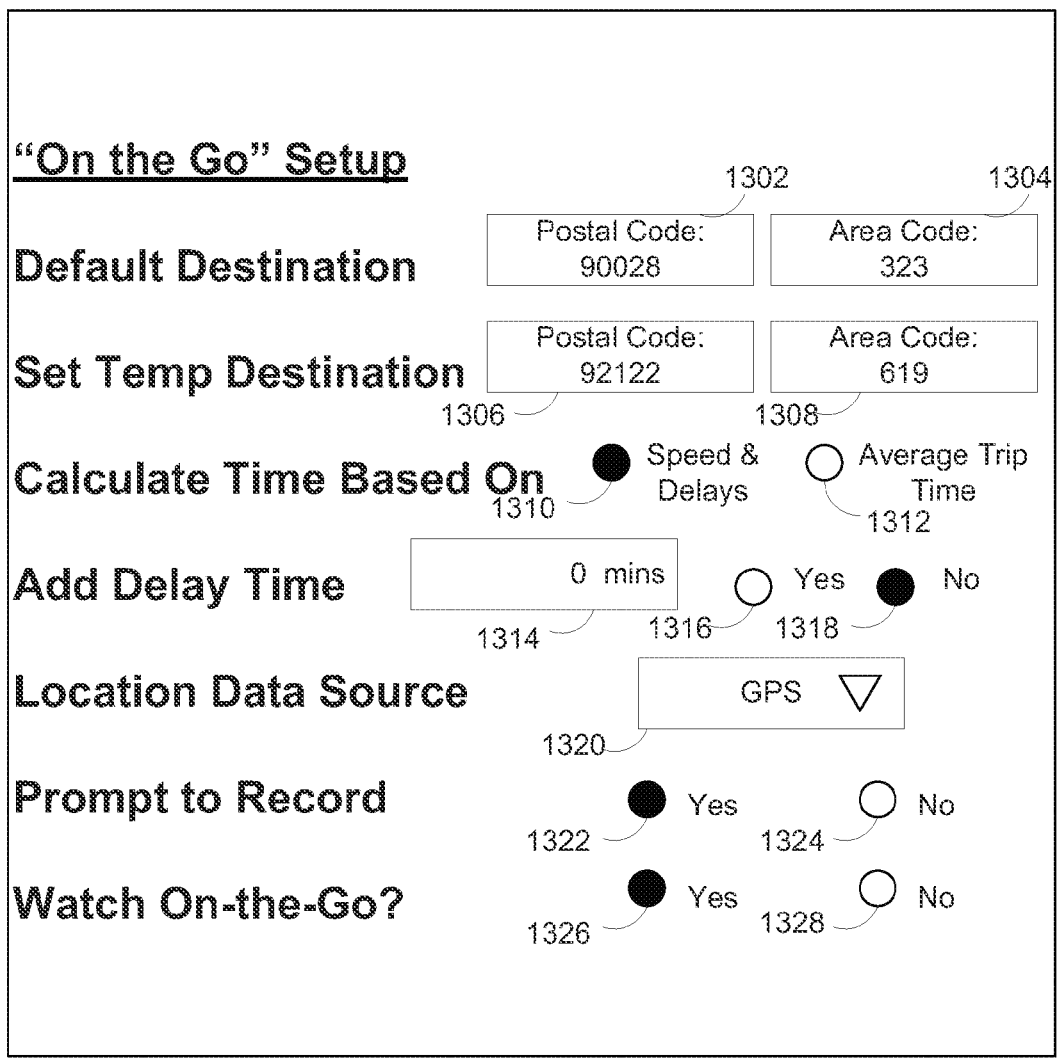
FIG. 13 illustrates an example of a setup screen in an interactive media guidance application in accordance with some embodiments of the present invention.

Next, at step 504, a destination of the user and/or the user's user equipment device may be determined. The destination may be represented as any suitable geographic reference. For example, the destination may be represented as an address, a city, a county, a state, a zip code, a latitude and longitude, an area code, a distance and/or direction from the current location, etc. This determination may be made in any suitable manner using any suitable information. For example, this determination may be made by receiving information from the user, such as in response to a prompt or using a default or temporary setting (e.g., as illustrated in FIG. 13). As another example, this determination may be made by receiving destination information associated with a route or a waypoint in a navigation system.

At step 506, the arrival time for the user and/or the user's user equipment device at the destination may be determined. The arrival time may be represented in any suitable manner. For example, the arrival time may be represented as an absolute time (e.g., 7:30 pm) or may be represented as a relative time (e.g., 1 hour and 30 minutes (1:30) from the current time). This determination may be made in any suitable manner using any suitable information. For example, this determination may perform a calculation of the time from the current location to the destination based on the distance and a speed between these points. As another example, this determination may receive an arrival time from a navigation system. As still another example, this determination may be based on the average travel time between these two points during previous trips. As yet another example, the arrival time may be based on a scheduled arrival time (e.g., for a train, bus, or plane). As yet another example, this determination may additionally take into account one or more delays, such delays due to congestion, accidents, waiting times, transfer times, walking times, weather, construction, flight delays, etc. As yet another example, this determination may additionally take into account time changes due to time zone changes, daylight savings time, etc. How this arrival time is calculated may be based on user input (e.g., as illustrated in FIG. 13). After the calculation of the arrival time is completed, in one embodiment, a user may watch a program while in transit such that the interactive media guidance application may display a list of programs that the user may watch in its entirety before reaching the destination.

Figure 6:
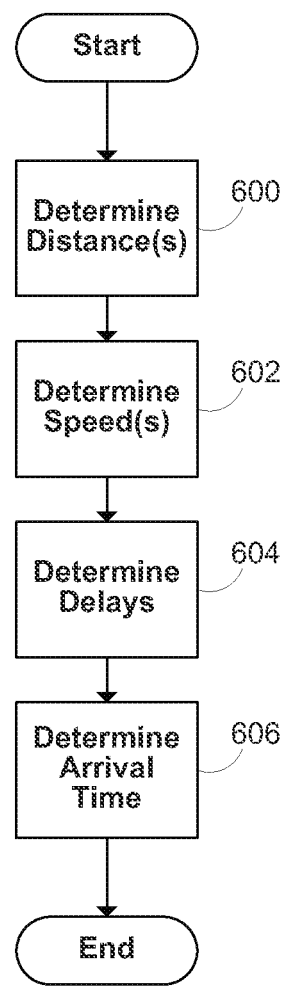
FIG. 6 illustrates an example of a process for determining an arrival time in an interactive media guidance application in accordance with some embodiments of the present invention.

Referring to FIG. 6, an example of steps that may be performed in performing step 506 of FIG. 5 is illustrated. As shown, initially, the distance(s) between the current location and the destination may be determined at step 600. The distance(s) may be determined in any suitable manner using any suitable information. For example, a single total distance may be obtained from a navigation system. As another example, multiple distances may be calculated for portions of a route specified for the trip between the current location and the destination.

Next, the speed(s) of travel may be determined at step 602. The speed(s) may be determined in any suitable manner using any suitable information. For example, an average speed for the distance may be determined based on previous trips, the mode of transportation (e.g., a train's known average speed), etc. As another example, various speeds may be determined based on the speed limits for different portions of a route between the current location and the destination.

At 604, delays may be determined. The delays may be determined in any suitable manner using any suitable information. For example, the delays may take into consideration congestion, accidents, waiting times, transfer times, walking times, weather, construction, flight delays, etc. This delay information may be obtained from any suitable source (e.g., from a user input as illustrated in FIG. 13).

Based on the distance(s), speed(s), delays, and any other suitable information, an arrival time may be determined at 606.

In some embodiments, pre-arrival interactive media guidance applications (pre-arrival guides) and post-arrival interactive guidance applications (post-arrival guides) may be presented. A pre-arrival guide may present information for items of media content that are available to be viewed or listened-to before the user arrives at the destination (e.g., while the user is in transit). The information presented in a pre-arrival guide may correspond to one or more geographic areas through which the user and/or the user's user equipment device is passing or will pass on the way to the destination. A post-arrival guide may present information for items of media content that are available to be viewed or listened-to at the destination, whether at the current time, at the arrival time, or at any other time.

Turning back to FIG. 5, at step 508, it may next be determined whether a pre-arrival guide is to be presented. This determination may be performed in any suitable manner using any suitable information. For example, this determination may be made by receiving information from the user, such as in response to a prompt or using a default setting (e.g., as illustrated in FIG. 13). As another example, this determination may be made based on the amount of time remaining before the arrival time. As still another example, this determination may be made based upon whether media content is available to be viewed while the user is in transit.

If it is determined at step 508 that a pre-arrival guide is to be presented, then, at step 510, a pre-arrival guide may be presented. Examples of pre-arrival guides are shown and described below in connection with FIGS. 7-10. If it is determined at step 508 that a pre-arrival guide is not to be presented, then at step 512, a post-arrival guide may be presented. Examples of post-arrival guides are shown and described below in connection with FIGS. 11-12. In presenting a pre-arrival guide or a post-arrival guide, data for the guide may be obtained from any suitable media guidance data source (e.g., from a locally stored database, from a remote service, etc.) at any time (e.g., on demand or in advance).

In some embodiments, pre-arrival guides may not be used, and therefore steps 508 and 510 may be omitted. In such cases, step 506 may branch directly to step 512.

The operation of a pre-arrival guide and/or post-arrival guide may be similar to that described above in connection with the interactive media guidance applications of FIGS. 1 and 2. For example, a user may move a highlight region 110 to a cell containing a description of media content, and press a button on a remote control to select that media content. Selection of media content may be made for various reasons. For example, media content may be selected so that the user can view or listen to the content. As another example, media content may be selected so that the user can record the media content. As still another example, media content may be selected so that the user can set a reminder to watch the media content.

If a user selects media content presented in a pre-arrival guide or a post-arrival guide, the selection may be received at step 514. Next, at step 516 it may be determined whether the media content is available to be watched or listened to prior to the arrival time. If it is, then at step 518 it may be determined whether the media content is to be presented now. This determination may be made in any suitable manner using any suitable information. For example, the user may be prompted as to whether he or she wants to view or listen-to the media content (e.g., using a default setting as illustrated in FIG. 13). As another example, a button the user pressed (or other input action) in selecting the media content may also indicate that the user desires to view or listen-to the media content.

If it is determined at step 518 that the media content is to be presented now, the media content May then be presented at step 520. Any suitable manner for presenting the selected media content may be used.

If it is determined at step 518 that the media content is not to be presented now, after the media has been presented at step 520, or if the media content is not available before the arrival time, it may then be determined at step 522 if the media content is to be recorded. This determination may be made in any suitable manner using any suitable information. For example, the determination may be made based on a prompt to the user. As another example, the determination may be made based on a default setting (e.g., as shown in FIG. 13). As still another example, the determination may be made based on a button pressed (or other input made) when the user selected the media content. As yet another example, the determination may be made based on the capabilities of the user's user equipment device through the communications capabilities between these devices.

If it is determined at step 522 that the media content is to be recorded, the media content may be configured to be recorded at step 524. This may be performed in any suitable manner, for example, using the techniques and mechanisms described above in connection with FIGS. 1-4. As another example, media content may be configured to be recorded using a digital video recorder (DVR). The recording may be performed on any desired user equipment device. For example, a user traveling with a portable user equipment device may configure the recording to happen on the user's home user equipment device.

In some embodiments, recording of selected media content may be configured, to occur on user equipment devices at the destination, or coupled to the destination, but not owned or controlled by the user. For example, a user planning to travel, or traveling, to a hotel (or any other public or private accommodation) may be able designate that the selected media content is to be recorded on a user equipment device operated by the hotel (or other operator), or a third party. This user equipment device may be located, for example, in a hotel room, in a central location at a hotel, or at an offsite location coupled to the hotel. This media content may be recorded before or after the time that the user first arrives at the destination. In some embodiments, the hotel (or other operator) or third party may charge the user a fee for recording the media content and/or making the media content available to the user.

Similarly, the user may designate that recording of media content is to occur on user equipment devices owned or controlled by the user, but playback is to occur on playback equipment owned or controlled by a hotel (or other operator) or a third party. The media content may be provided using any suitable technique (e.g., such as streaming) from the user's user equipment devices to playback equipment at a hotel or other public or private accommodation via any suitable communication network. In some embodiments, the hotel (or other operator) or third party may charge the user a fee for making the media content available to the user.

To facilitate recording or playback on hotel (or other operator) or third party equipment, in some embodiments, the destination may be specified by the user using a special code that both designates a geographical location and a logical address for a device that will facilitate the recording or playback. For example, a telephone number may be used to specify a room in a hotel, and thereby indicate that media content is to be recorded by a DVR in that room.

In some embodiments, when media content is selected from a pre-arrival guide and a portion of the media content is presented, it may be determined whether any portion of the media content may not be available to the user. This unavailability may be for any reason such as the user arriving at the destination before the media content presentation is complete, the user having to stop the presentation of the media content before the presentation is complete (e.g., because the user has to switch trains, walk for some final portion of the trip, etc.), the media content signal being lost (e.g., due to a train entering a tunnel, a vehicle going to an area outside of a wireless network, etc.), broadcasting restrictions (e.g., blackouts of sporting events), etc. If it is determined that a portion of the media content may be unavailable, that portion, or all, of the media content may be designated as to be recorded. This recording may be performed on any desired user equipment device, and which user equipment device performs the recording may be based on which device the media content is available to. For example, a user traveling with a portable user equipment device may configure the recording to happen on the user's home user equipment device where that home device is not subject to blackout restrictions.

After configuring the media content to be recorded at step 524, or if it is determined at step 522 that the media content is not to be recorded, then at step 526 it may be determined if a reminder is to be set for the media content. This determination may be made in any suitable manner using any suitable information. For example, the determination may be made based on a prompt to the user. As another example, the determination may be made based on a default setting. As still another example, the determination may be made based on a button pressed (or other input made) when the user selected the media content. As yet another example, the determination may be made based on the capabilities of the user's user equipment device.

If it is determined at step 526 that a reminder is to be set for the media content, then at step 528 a reminder may be configured. The reminder may be configured in any suitable manner using any suitable information. For example, the reminder may be set to cause a message to be displayed on a television 15 minutes before the media content is to be presented. As another example, the reminder may be set to send an email, instant message, or text (SMS) message at a given point prior to the presentation of the media content.

After configuring the reminder at step 528, or if it is determined that no reminder is to be set at step 526, process 500 may end.

Figure 7:
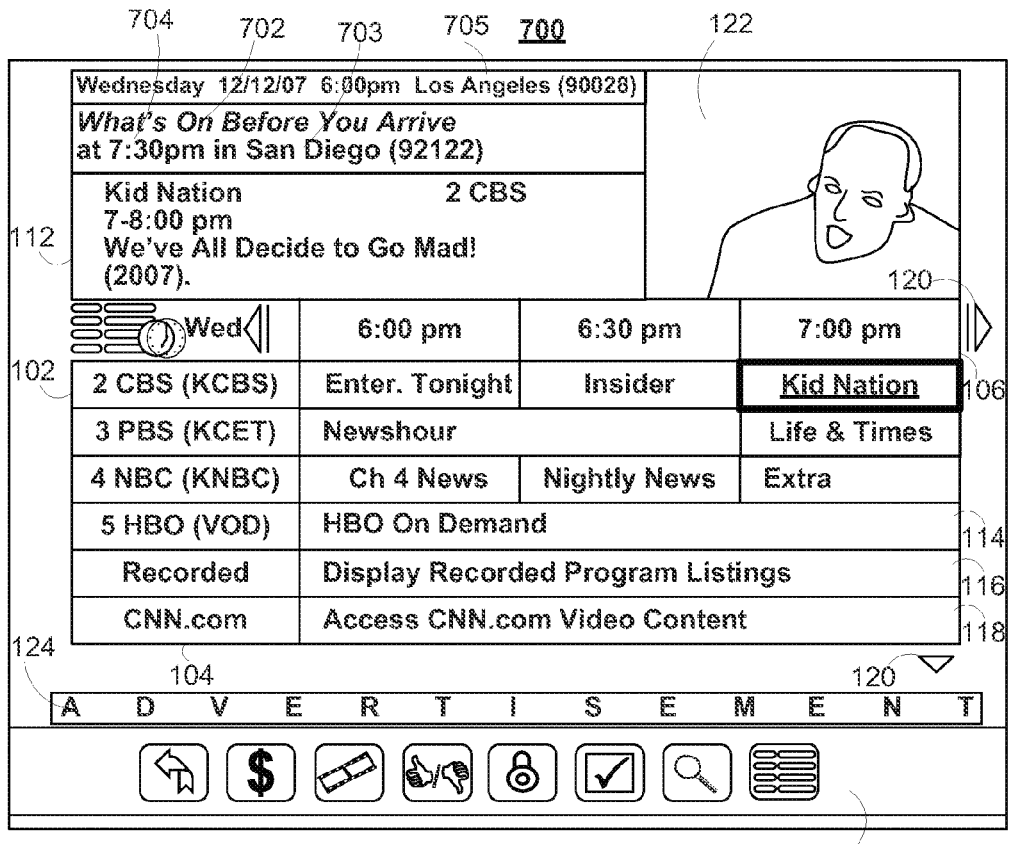
FIG. 7 illustrates an example of a grid display for a pre-arrival guide in an interactive media guidance application in accordance with some embodiments of the present invention.

Examples of pre-arrival guides are now illustrated in connection with FIGS. 7-10. Turning first to FIG. 7, it can be seen from message 702 that a pre-arrival guide 700 is shown. Guide 700 may include an arrival time indicator 704 to indicate the determined arrival time at the destination 703. As illustrated in this example, the arrival time is 7:30 pm, and thus media content available between the current time (e.g., 6:00 pm) and the arrival time are identified. In some embodiments, only content/media type identifiers 104 corresponding to media content that can be accessed by the user between the current time and the arrival time are presented in guide 700. Other features of guide 700 may be performed in the same or a similar manner to that described in connection with display 100 of FIG. 1. Guide 700 may also include a current location indicator 705.

Figure 8:
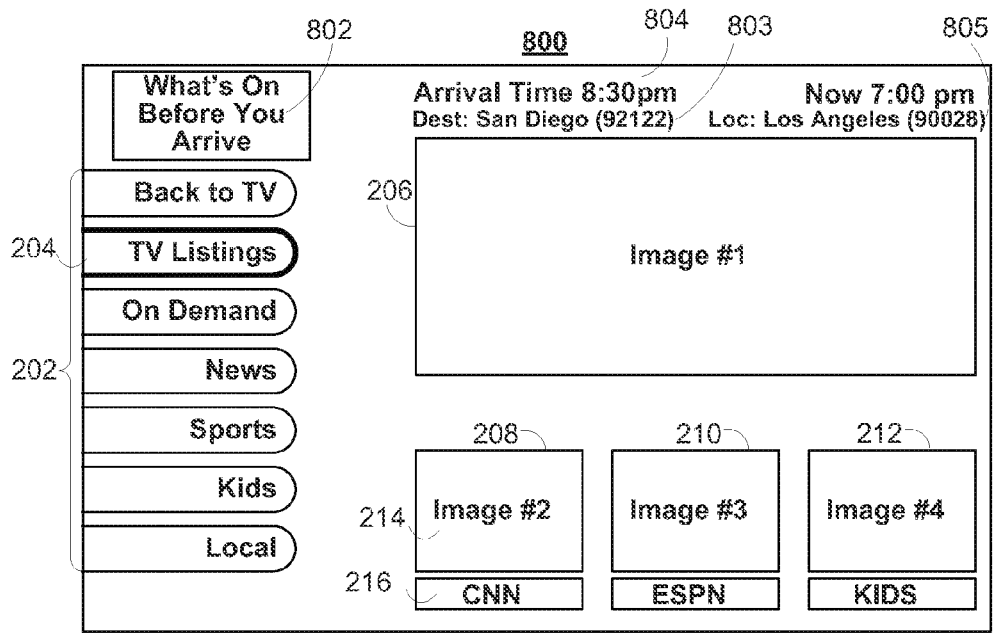
FIG. 8 illustrates an example of a mosaic display for a pre-arrival guide in an interactive media guidance application in accordance with some embodiments of the present invention.

An alternate form of pre-arrival guide is illustrated as guide 800 of FIG. 8. As shown, guide 800 may include a message 802 to indicate that it is a pre-arrival guide, an arrival time indicator 804, a destination indicator 803, and a current location indicator 805. As with guide 700, the media content identified in guide 800 may be limited to media content that can be accessed by the user while traveling to the destination. Other features of guide 800 may be performed in the same or a similar manner to that described in connection with display 200 of FIG. 2.

Figure 9:
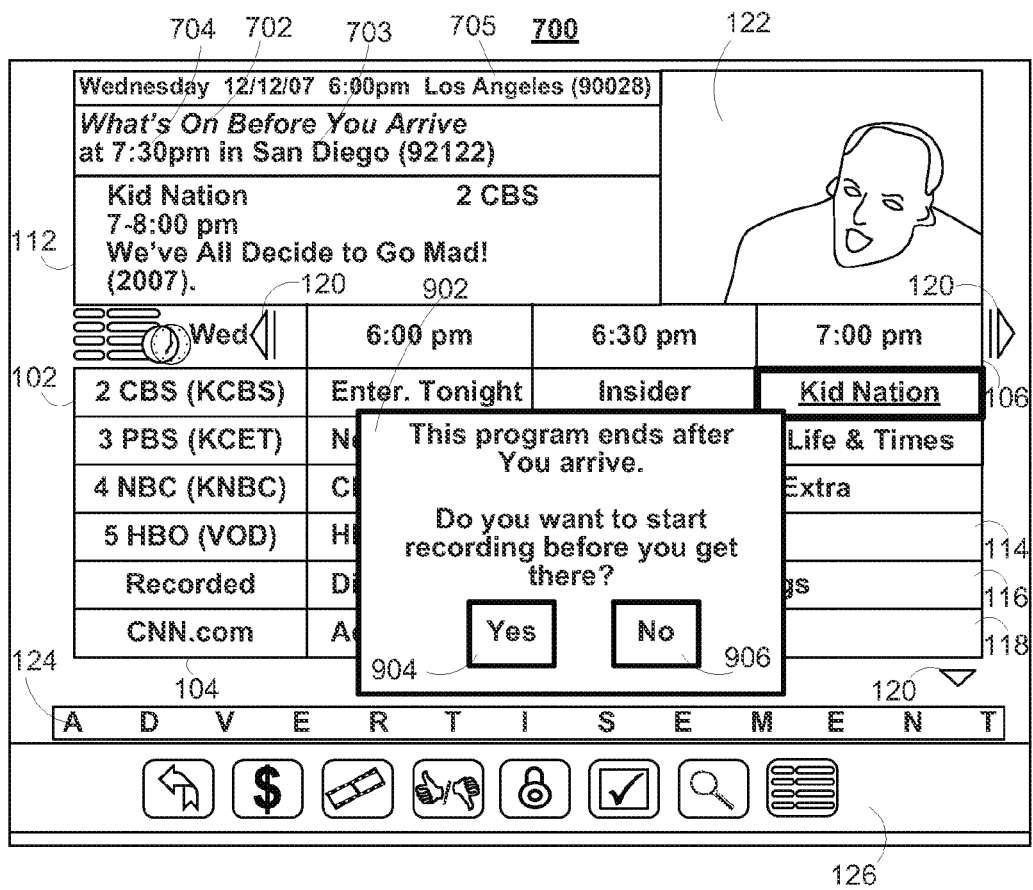
FIG. 9 illustrates an example of a prompt for recording a program in a pre-arrival guide in an interactive media guidance application in accordance with some embodiments of the present invention.

As shown in FIG. 9, in some embodiments, if a user selects media content that will end after the arrival time, the user may be prompted with a prompt 902 to indicate whether the user wants to start recording the media content before the user gets to the destination. The user may respond to the prompt by selecting one of buttons 904 and 906. If the user selects to record the media content, recording may be configured as described above in connection with FIG. 5.

Figure 10:
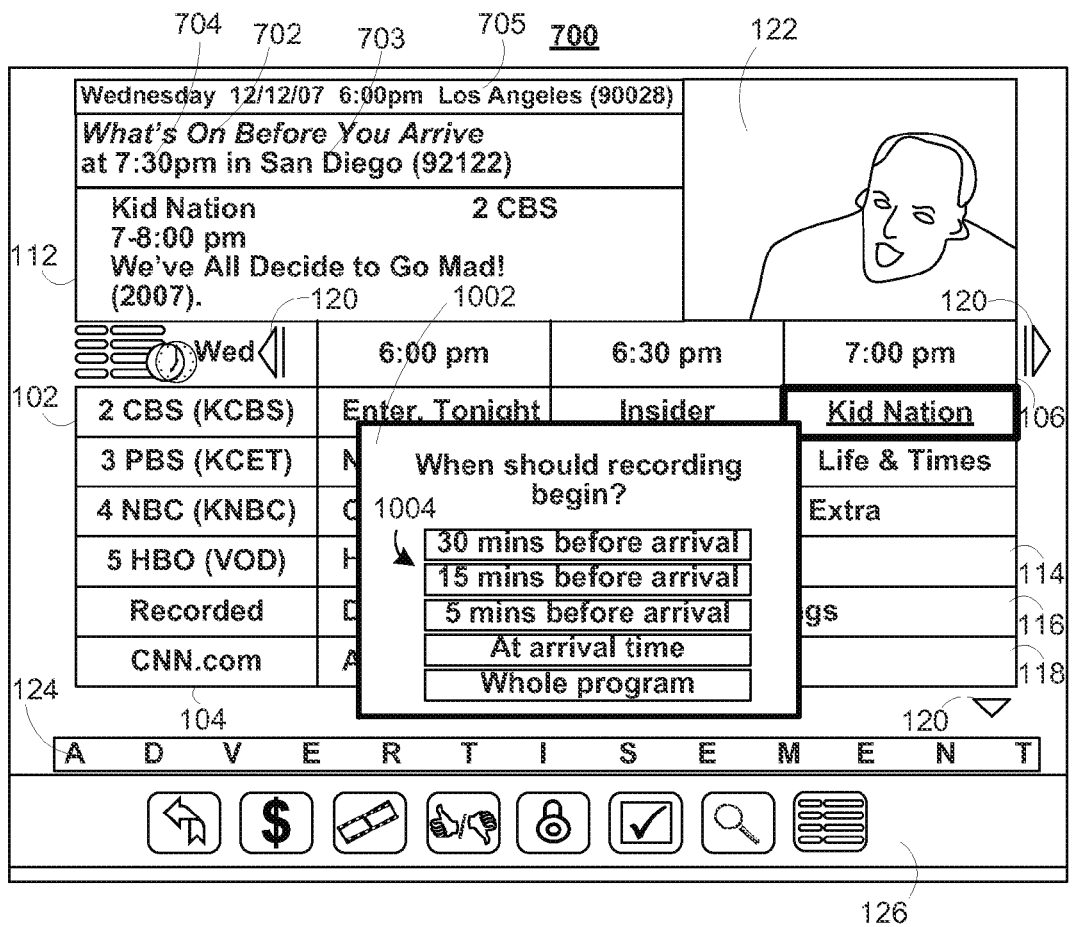
FIG. 10 illustrates an example of a prompt for receiving a recording beginning time in a pre-arrival guide in an interactive media guidance application in accordance with some embodiments of the present invention.

In some embodiments, when recording is selected to occur, the user may be prompted as to when to begin recording the media content as illustrated in FIG. 10. As shown, the user may be presented with a prompt 1002 that asks the user to specify a recording begin time. This time may be specified in any suitable manner. For example, as shown, the user may be presented with buttons 1004 for specifying to begin recording at 30 minutes before the arrival time, 15 minutes before the arrival time, five minutes before the arrival time, at the arrival time, at the beginning of the program, etc.

Figure 11:
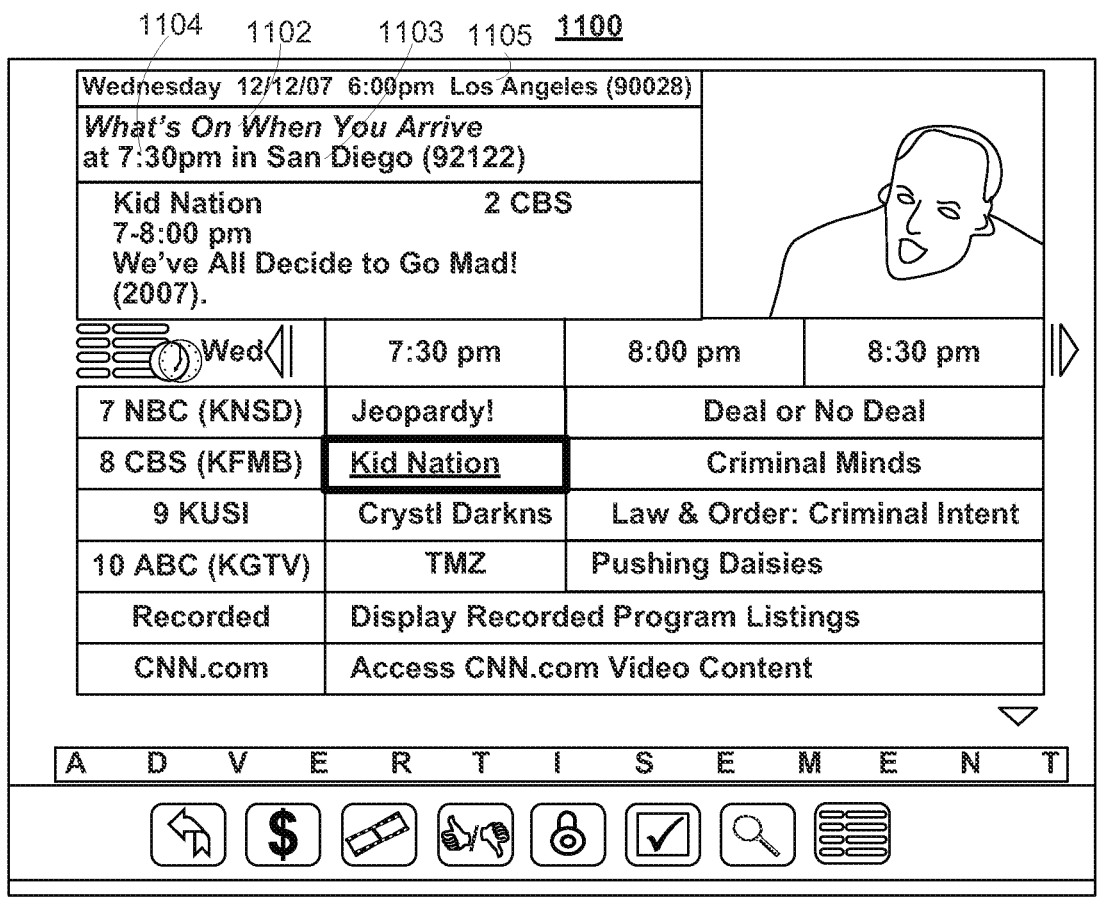
FIG. 11 illustrates an example of a grid display for a post-arrival guide in an interactive media guidance application in accordance with some embodiments of the present invention.

Examples of post-arrival guides are now illustrated in connection with FIGS. 11-12. Turning first to FIG. 11, it can be seen from message 1102 that a post-arrival guide 1100 is shown. Guide 1100 may include an arrival time indicator 1104 to indicate the determined arrival time at the destination 1103. As illustrated in this example, the arrival time is 7:30 pm, and thus media content available after the arrival time are identified. Guide 1100 may also include a current location indicator 1105. In some embodiments, only content/media type identifiers 104 corresponding to media content that can be accessed by the user at the destination are presented in guide 1100. Other features of guide 1100 may be performed in the same or a similar manner to that described in connection with display 100 of FIG. 1.

Figure 12:
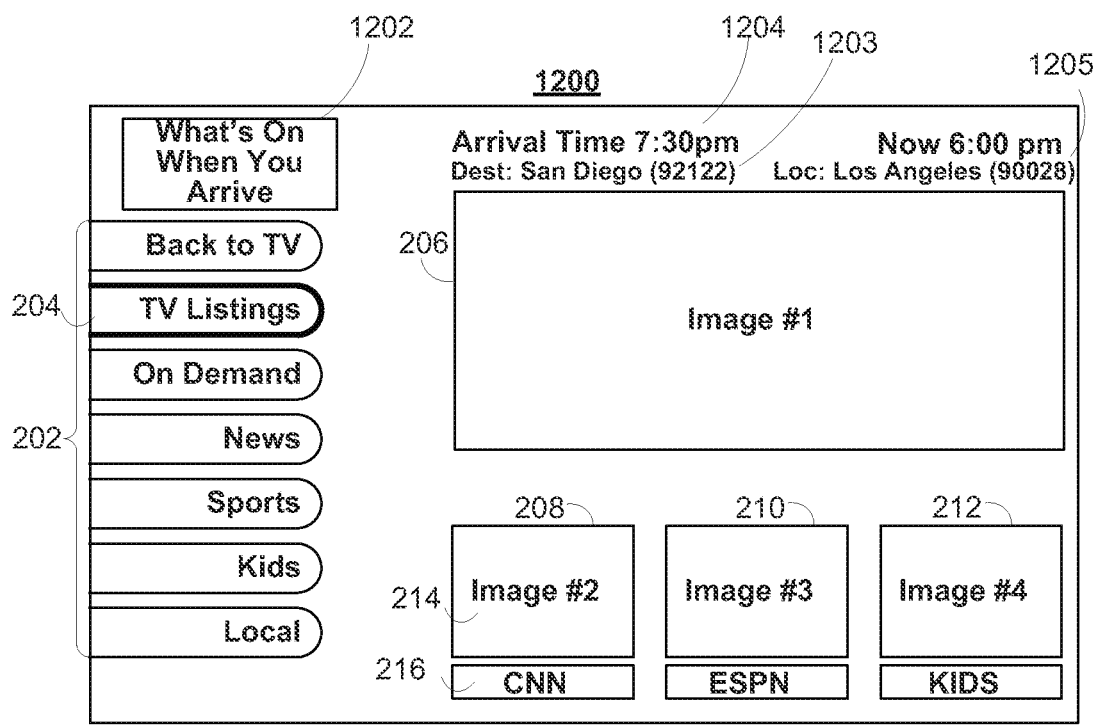
FIG. 12 illustrates an example of a mosaic display for a post-arrival guide in an interactive media guidance application in accordance with some embodiments of the present invention.

An alternate form of post-arrival guide is illustrated as guide 1200 of FIG. 12. As shown, guide 1200 may include a message 1202 to indicate that it is a post-arrival guide, an arrival time indicator 1204, a destination indicator 1203, and a current location indicator 1205. As with guide 1100, the media content identified in guide 1200 may be limited to media content that can be accessed by the user at the destination. Other features of guide 1200 may be performed in the same or a similar manner to that described in connection with display 200 of FIG. 2.

As shown in FIG. 13, a setup screen 1300 for an interactive media guidance application is illustrated. As shown, the user may be prompted to enter a default destination. The default destination may be specified using a postal code in field 1302, an area code in field 1304, or any other suitable default destination identifier. The user may also be prompted to enter a temporary destination using postal code field 1306, area code field 1308, or any other suitable temporary destination identifier. The temporary destination may be used to allow a user to keep the default destination always set at the user's home or office, and then use the temporary destination to override the default destination when making trips to other destinations.

As also shown in screen 1300, a user may be prompted to select how to calculate the arrival time based on the travel speed and delays, average trip time, or any other suitable criteria or criterion using radio buttons 1310 and 1312. The user may also be prompted to specify a delay time to be added to calculated arrival times using a field 1314 and radio buttons 1316 and 1318. The user may also be prompted to select the location data source using drop down menu 1320. As shown, the location data source may be provided by GPS circuitry. Using radio buttons 1322 and 1324, the user may be prompted whether to record media content. This setting may override or be factored into the other criteria that may be used for determining whether to record media content as described above. Finally, the user may be prompted whether to enable presentation of media content while traveling using radio buttons 1326 and 1328. This setting may be taken into account when making the determination of step 518 of FIG. 5.

Figure 14:
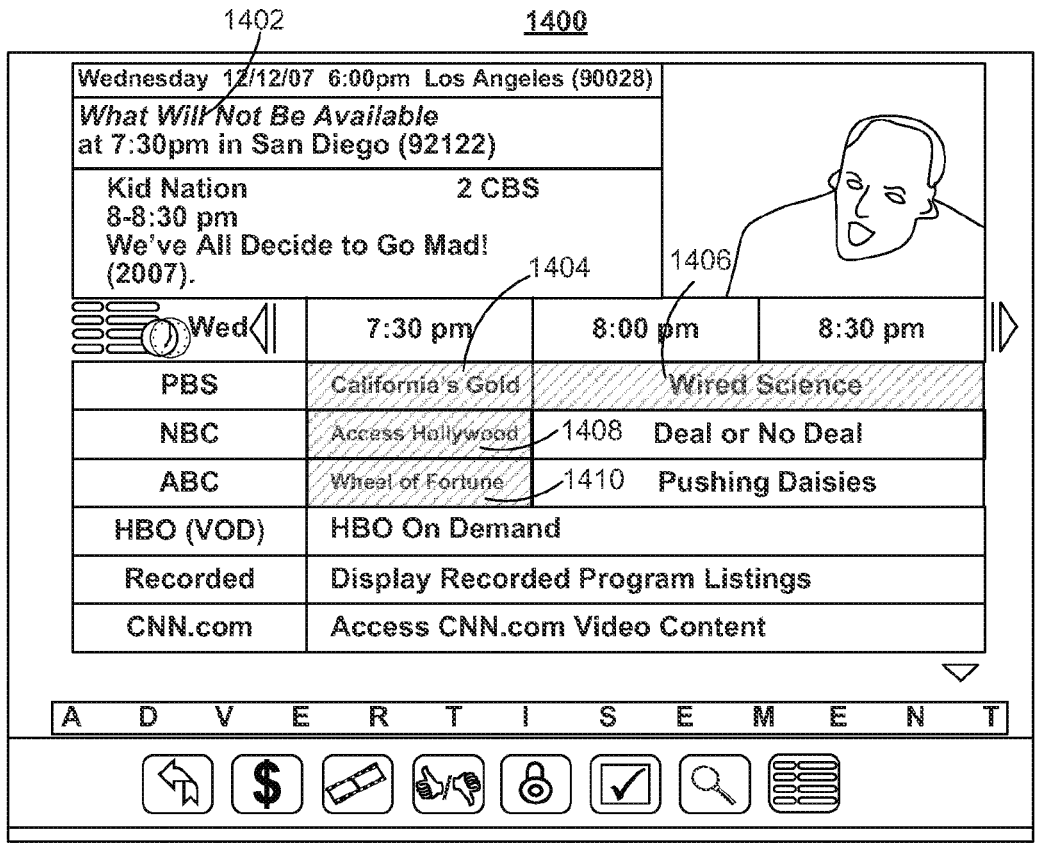
FIG. 14 illustrates an example of a grid display for an interactive media guidance application in which guide listing for media content that will not be available at the destination are shown in accordance with some embodiments of the present invention.

Turning to FIG. 14, another grid guide 1400 is illustrated. As indicated by message 1402, this guide indicates what media content that is available at the user's current location (e.g., the user's home) will not be available when the user arrives at the user's destination. Knowledge of what may not be available to the user may be desirable so that the user can record the program at another location, such as the user's home, for example. As shown, certain guide listings 1404, 1406, 1408, and 1410 are "grayed out" to indicate that they are not available at the destination.

Figure 15:
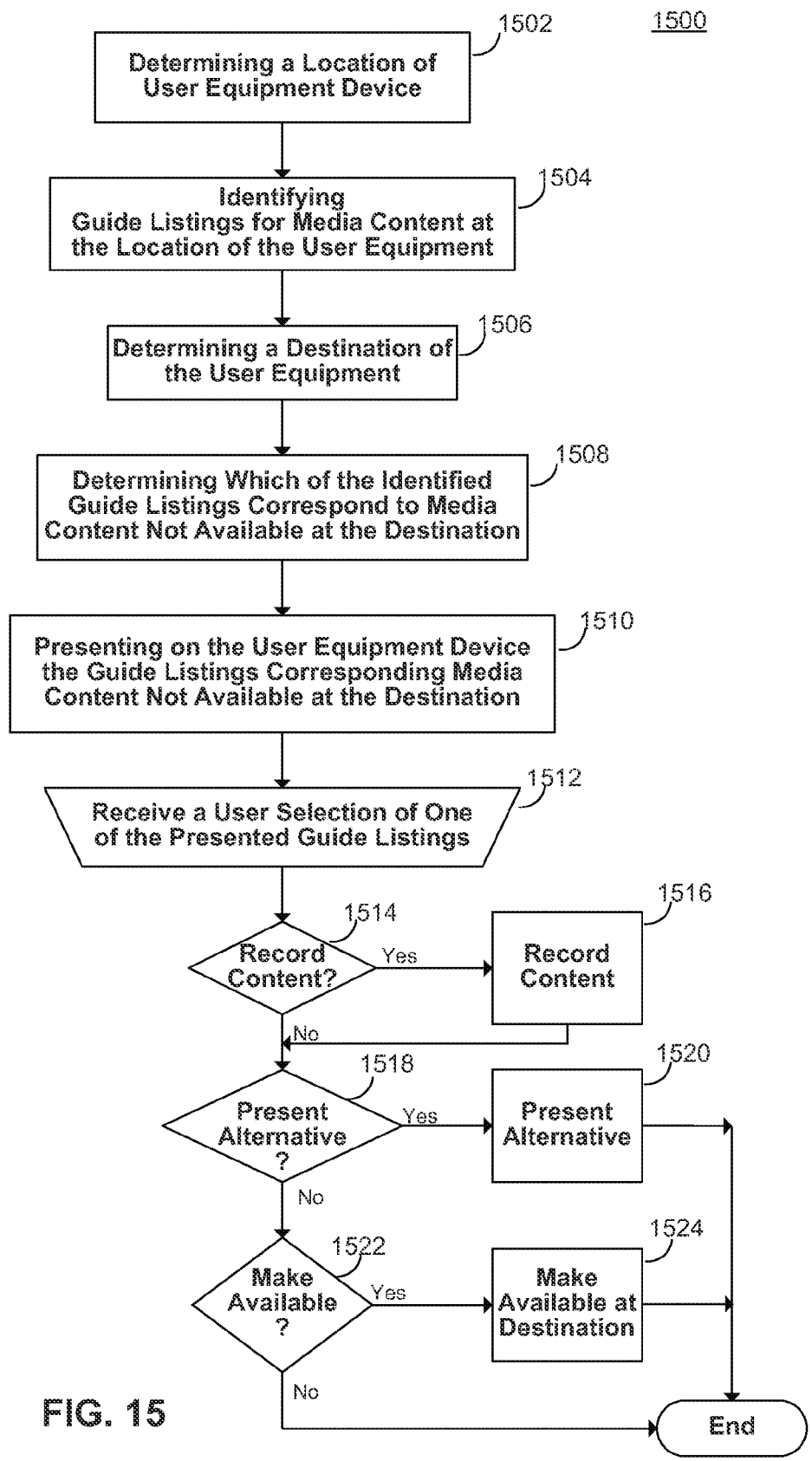
FIG. 15 illustrates an example of a process for the interactive media guidance application of FIG. 14 in accordance with some embodiments of the present invention.

FIG. 15 illustrates a process 1500 for presenting on a user equipment device a guide that indicates what programs will not be available at a destination in accordance with some embodiments. As shown, at step 1502, the location of the user equipment device is determined. This determination may be made using any suitable approach, such as described above in connection with step 502 of FIG. 5. Next, at 1504, guide listing for media content at the location of the user equipment may be identified. This identification may be limited in some embodiments to only lists between the current time and a given period of time in the future. At 1506, the destination of the user equipment may be determined. This destination may be determined using any suitable approach, such as described above in connection with step 504 of FIG. 5. Next, at step 1508, it may be determined which of the listings identified at 1504 corresponds to media content not available at the destination. These listings may then be presented to the user at 1510. In some embodiments, listings that are available at the destination may also be presented to the user (for example, as shown in FIG. 14 by the non-grayed-out listings).

After presenting the guide listings for media content that are not available at the destination, a selection of one of the listings may be received from the user at 1512. This selection may be made using any suitable technique, such as described above in connection with step 514 of FIG. 5. At step 1514, it may then be determined whether the media content corresponding to the selected listing is to be recorded. This determination may be made using any suitable approach, such as described above in connection with step 522 of FIG. 5. If it is determined at step 1514 that the media content is to be recorded, the content may be configured for recording at step 1516. For example, the content may be configured for recording at the user's home (or any other location at which the selected content is available). In some embodiments, the location where media content is to be recorded can be selected so as to facilitate transfer of the media content (e.g., via streaming) to the destination (which may be permitted at destinations such as hotels for a fee). For example, a location may be selected that has recording equipment that is also capable of streaming media content to the destination.

Next, process 1500 may determine at step 1518 whether listings for alternative media content should be presented to the user. This determination may be made based on any suitable criteria, such as whether the same media content is available at another time, whether a similar program is available, etc. If it is determined that listings for alternative content is to be presented to the user, the listings may be presented using any suitable approach, such as by a dialog box.

If an alternative listing is not presented to the user, at step 1522, it may be determined whether the content is to be made available to the user. This determination may be made based on any suitable criteria or criterion. For example, this determination may be based on whether the user has configured the media content to be recorded or whether the destination has authorized the delivery of the content (e.g., when a hotel requires payment of a fee to stream content to the hotel). If it is determined at step 1522 that the content is to be made available at the destination, the content may be configured for availability at the destination at step 1524.

Figure 16:
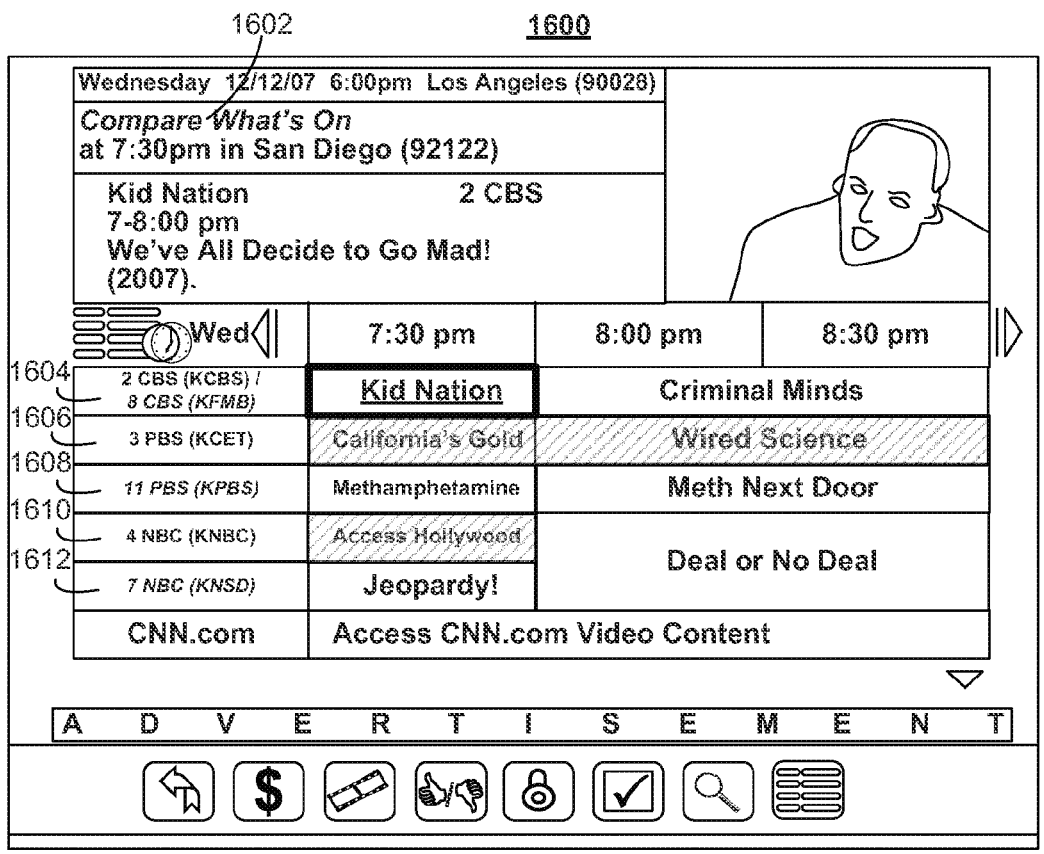
FIG. 16 illustrates an example of a grid display for an interactive media guidance application in which guide listings for a current location and a destination are compared in accordance with some embodiments of the present invention.

Another example of a guide 1600 is illustrated in FIG. 16 in which, as shown by message 1602, a user can compare listings between a current location and a destination. For example, row 1604 shows that channels "2 CBS (KCBS)" (for Los Angeles) and "8 CBS (KFMB)" (for San Diego) during the period 7:30 pm through 9:00 pm have the same media content available by showing the same, not-grayed-out listings for both channels. As another example, rows 1606 and 1608 indicate that channels "3 PBS (KCET)" (for Los Angeles) and "11 PBS (KPBS)" (for San Diego) during the same period do not have any of the same media content available by showing the listings for "3 PBS (KCET)" grayed-out and the listings for "11 PBS (KPBS)" not grayed-out. As yet another example, rows 1610 and 1612 indicated that channels "4 NBC (KNBC)" (for Los Angeles) and "7 NBC (KNSD)" (for San Diego) have different media content between 7:30 pm and 8:00 pm by showing one guide listing grayed-out and the other guide listing not-grayed out, and the same media content between 8:00 pm and 9:00 pm by showing a single, non-grayed-out guide listing.

Figure 17:
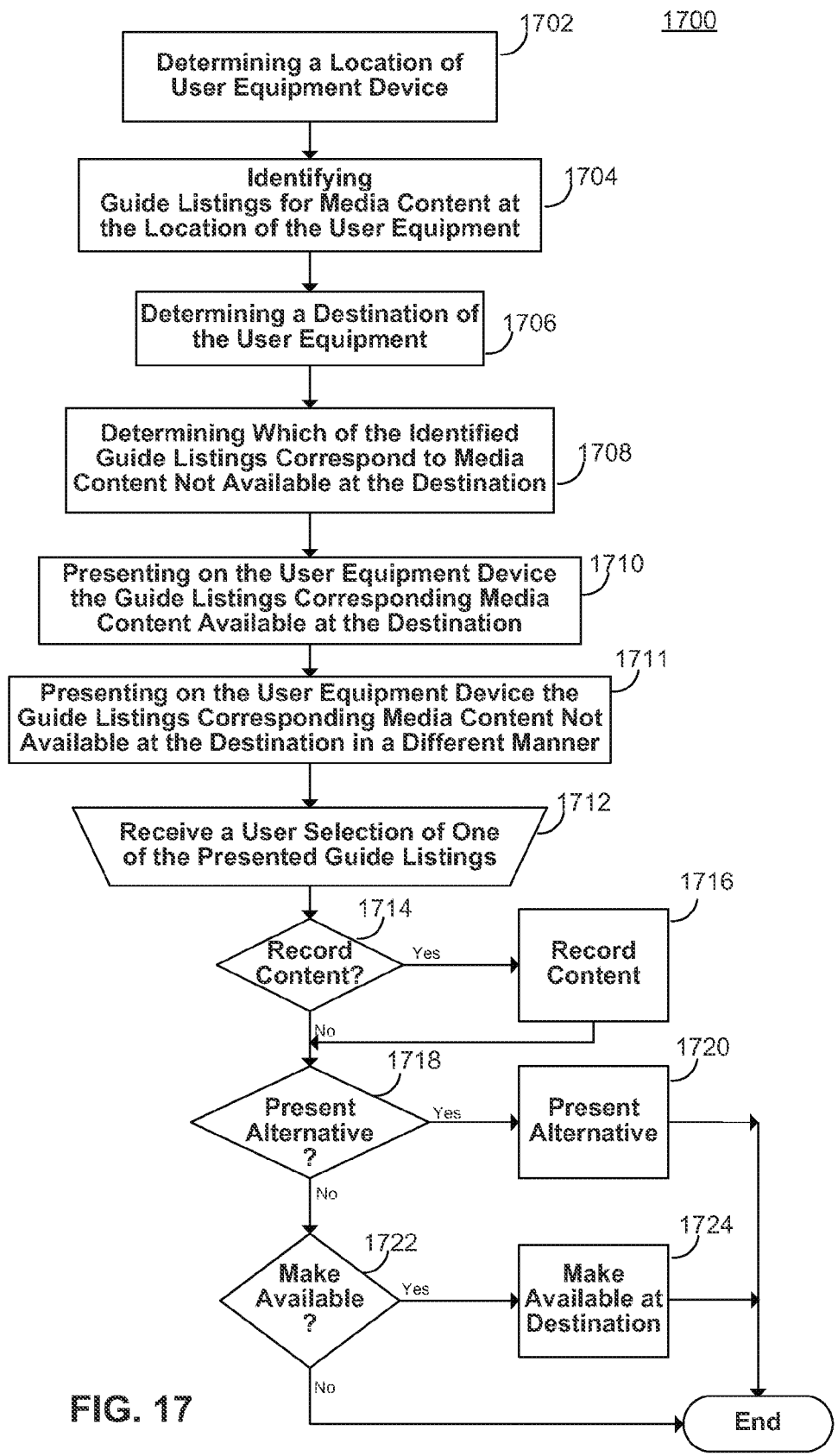
FIG. 17 illustrates an example of a process for the interactive media guidance application of FIG. 16 in accordance with some embodiments of the present invention.

Turning to FIG. 17, a process 1700 for presenting on a user equipment device guide that indicates a comparison of what programs will be available at a current location versus a destination in accordance with some embodiments. As shown, at step 1702, the location of the user equipment device is determined. This determination may be made using any suitable approach, such as described above in connection with step 502 of FIG. 5. Next, at 1704, guide listing for media content at the location of the user equipment may be identified. This identification may be limited in some embodiments to only listings between the current time and a given period of time in the future. At 1706, the destination of the user equipment may be determined. This destination may be determined using any suitable approach, such as described above in connection with step 504 of FIG. 5. Next, at step 1708, it may be determined which of the listings identified at 1704 corresponds to media content not available at the destination. The remainder of the listings may then be presented to the user at 1710. Next, at 1711, listings that are available at the destination may also be presented to the user (for example, as shown in FIG. 14 by the non-grayed-out listings).

Next, a selection of one of the listings may be received from the user at 1712. This selection may be made using any suitable technique, such as described above in connection with step 514 of FIG. 5. At step 1714, it may then be determined whether the media content corresponding to the selected listing is to be recorded. This determination may be made using any suitable approach, such as described above in connection with step 522 of FIG. 5. If it is determined at step 1714 that the media content is to be recorded, the content may be configured for recording at step 1716. For example, the content may be configured for recording at the user's home (or any other location at which the selected content is available). In some embodiments, the location where media content is to be recorded can be selected so as to facilitate transfer of the media content (e.g., via streaming) to the destination (which may be permitted at destinations such as hotels for a fee). For example, a location may be selected that has recording equipment that is also capable of streaming media content to the destination.

Next, process 1700 may determine at step 1718 whether listings for alternative media content should be presented to the user. This determination may be made base on any suitable criteria, such as whether the same media content is available at another time, whether a similar program is available, etc. If it is determined that listings for alternative content is to be presented to the user, the listings may be presented using any suitable approach, such as by a dialog box.

If an alternative listing is not presented to the user, at step 1722, it may be determined whether the content is to be made available to the user. This determination may be made based on any suitable criteria or criterion. For example, this determination may be based on whether the user has configured the media content for recording or whether the destination has authorized the delivery of the content (e.g., when a hotel requires payment of a fee to stream content to the hotel). If it is determined at step 1722 that the content is to be made available at the destination, the content is configured for availability at the destination at step 1724.

In accordance with some embodiments, a trip wizard may be provided to manage a user's favorite media content while away. For example, as illustrated in FIG. 18, a trip wizard 1800 may prompt a user for a departure date 1802, a return date 1804 and a destination 1806. Trip wizard 1800 may also ask the user whether it should generate reminders at the destination 1808, record favorite shows 1810, and forward favorite shows to the destination 1812.

Upon entering a departure date and a return date, the trip wizard may take certain actions to assist the user in being presented with the user's favorite media content while away and/or when the user returns. What content is a user's favorite media content may be based on any suitable criteria or criterion. For example, the user's favorite media content may be that content watched or listened to the most by the user. As another example, the user's favorite media content may be that content explicitly specified (e.g., NY Yankees games) or falling into a category explicitly categorized by the user (e.g., Major League Baseball games).

In some embodiments, to assist the user in being presented with the user's favorite media content, the trip wizard may generate reminders (during the period of the trip) at the destination to watch the user's favorite television shows. These reminders may be conveyed using any suitable mechanism. For example, the reminders may be presented on a television screen in a hotel room (in which case, a fee may be charged by the hotel), may be presented as SMS messages on a mobile phone, may be presented as email messages on a portable email device, etc.

In some embodiments, the trip wizard may additionally or alternatively record the user's favorite media content so that the user can be presented with that content after the trip. The recording of the favorite media content may be performed specifically during the period of the trip.

In some embodiments, the trip wizard may forward the user's favorite media content to a hotel (or other destination) at which the user is staying. As mentioned above, the hotel, or a third-party, may charge a fee for this service. For example, a sports fan who would like to watch games of his/her favorite team while away, but is unable to do so with local broadcasts because of local programming limitations, may configure the trip wizard to forward the broadcast of the games from the user's home via the Internet to a DVR located in the user's hotel room.

Thus, it is seen that methods and systems for presenting a guidance application in a mobile device are provided. One skilled in the art will appreciate that the invention can be practiced by other than the described embodiments, which are presented for purposes of illustration and not of limitation, that various features of the described embodiments can be interchanged and used in any suitable combination, and that the present invention is limited only by the claims which follow.

What is claimed is:

1. A method for providing media to a user in transit, the method comprising:
   receiving, through an input interface, a user request to view a media asset on a mobile device while the user is travelling to a destination;
   determining, with processing circuitry and based on location data provided by location circuitry in the mobile device, whether reception of the media asset by the mobile device will be interrupted prior to or upon arrival at the destination; and
   in response to determining that the reception of the media asset by the mobile device will be interrupted, automatically transmitting an instruction to a second device to store at least a portion of the media asset determined to coincide with the interruption.

2. The method of claim 1, wherein determining whether reception of the media asset by the mobile device will be interrupted further comprises:
   computing an arrival time for the user travelling to the destination; and
   comparing the arrival time with an expected end time of the media asset.

3. The method of claim 1, wherein determining whether reception of the media asset by the mobile device will be interrupted further comprises analyzing a route to the destination of the user to determine whether any portion of the route is associated with signal loss.

4. The method of claim 1, wherein determining whether reception of the media asset by the mobile device will be interrupted further comprises analyzing a route to the destination of the user to determine whether a portion of the route is associated with broadcasting restrictions that apply to the media asset.

5. The method of claim 1, wherein determining whether reception of the media asset by the mobile device will be interrupted further comprises analyzing a route to the destination of the user to determine whether the user is scheduled to switch from a first mode of transportation to a second mode of transportation.

6. The method of claim 1, wherein the automatically transmitting the instruction to the second device further comprises:
   determining whether the portion of the media asset is available at the second device; and
   transmitting the instruction to the second device to store the portion of the media asset if the portion of the media asset is available at the second device.

7. The method of claim 6, wherein the instruction is a first instruction, and further comprising:
   receiving a user selection of the media asset from a third device; and
   transmitting a second instruction to the third device to play back the portion of the media asset stored on the second device.

8. The method of claim 1, further comprising determining whether to automatically transmit the instruction to the second device based on at least one of a user response to a prompt, a default setting, the user request to view the media asset, and capabilities of the mobile device.

9. The method of claim 1, further comprising generating for display an interactive program guide wherein a first plurality of media assets are marked as available if they will not be interrupted prior to or upon arrival at the destination, and a second plurality of media assets are marked as unavailable if they will be interrupted prior to or upon arrival at the destination.

10. The method of claim 1 further comprising prompting the user to indicate a time to begin recording the media asset in response to determining that reception of the media asset by the mobile device will be interrupted prior to or upon arrival at the destination, and wherein automatically transmitting the instruction to the second device comprises transmitting the instruction to the second device to record the media asset starting at the time indicated by the user.

11. A system for providing media to a user in transit, the system comprising:
   location circuitry in a mobile device configured to provide location data; and
   processing circuitry in the mobile device configured to:
      receive, through an input interface, a user request to view a media asset while the user is travelling to a destination;
      determine, based on the location data provided by the location circuitry, whether reception of the media asset by the mobile device will be interrupted prior to or upon arrival at the destination; and
   communications circuitry configured to, in response to the processing circuitry determining that the reception of the media asset by the mobile device will be interrupted, automatically transmit an instruction to a second device to store at least a portion of the media asset determined to coincide with the interruption.

12. The system of claim 11, wherein the processing circuitry is configured to determine whether reception of the media asset by the mobile device will be interrupted by:
   computing an arrival time for the user travelling to the destination; and
   comparing the arrival time with an expected end time of the media asset.

13. The system of claim 11, wherein the processing circuitry is configured to determine whether reception of the media asset by the mobile device will be interrupted by analyzing a route to the destination of the user to determine whether any portion of the route is associated with signal loss.

14. The system of claim 11, wherein the processing circuitry is configured to determine whether reception of the media asset by the mobile device will be interrupted by analyzing a route to the destination of the user to determine whether a portion of the route is associated with broadcasting restrictions that apply to the media asset.

15. The system of claim 11, wherein the processing circuitry is configured to determine whether reception of the media asset by the mobile device will be interrupted by analyzing a route to the destination of the user to determine whether the user is scheduled to switch from a first mode of transportation to a second mode of transportation.

16. The system of claim 11, wherein the communications circuitry configured to automatically transmit the instruction to the second device is further configured to:
   determine whether the portion of the media asset is available at the second device; and
   transmit the instruction to the second device to store the portion of the media asset if the portion of the media asset is available at the second device.

17. The system of claim 11, wherein the instruction is a first instruction, and wherein:
   the processing circuitry is further configured to receive a user selection of the media asset from a third device; and the communications circuitry is further configured to transmit a second instruction to the third device to play back the portion of the media asset stored on the second device.

18. The system of claim 11, wherein the processing circuitry is further configured to determine whether to, using communications circuitry, automatically transmit the instruction to the second device based on at least one of a user response to a prompt, a default setting, the user request to view the media asset, and capabilities of the mobile device.

19. The system of claim 11, wherein the processing circuitry is further configured to generate for display an interactive program guide wherein a first plurality of media assets are marked as available if they will not be interrupted prior to or upon arrival at the destination, and a second plurality of media assets are marked as unavailable if they will be interrupted prior to or upon arrival at the destination.

20. The system of claim 11, wherein the processing circuitry is further configured to prompt the user to indicate a time to begin recording the media asset in response to determining that reception of the media asset by the mobile device will be interrupted prior to or upon arrival at the destination, and wherein the communications circuitry configured to automatically transmit the instruction to the second device is further configured to transmit the instruction to the second device to record the media asset starting at the time indicated by the user.

* * * * *